United States Patent [19]

Marzocchi et al.

[11] 4,349,388

[45] * Sep. 14, 1982

[54] ASPHALT COMPOSITIONS MODIFIED WITH ORGANO SILANE COMPOUNDS

[75] Inventors: Alfred Marzocchi; Michael G. Roberts; Charles E. Bolen, all of Newark, Ohio

[73] Assignee: Owens-Corning Fiberglas Corporation, Toledo, Ohio

[ * ] Notice: The portion of the term of this patent subsequent to Sep. 29, 1998, has been disclaimed.

[21] Appl. No.: 218,901

[22] Filed: Dec. 22, 1980

Related U.S. Application Data

[60] Continuation of Ser. No. 133,170, Mar. 24, 1980, Pat. No. 4,292,371, which is a division of Ser. No. 66,207, Aug. 13, 1979, Pat. No. 4,243,426, which is a continuation-in-part of Ser. No. 852,772, Nov. 18, 1977, abandoned.

[51] Int. Cl.³ ............................................. C08L 95/00
[52] U.S. Cl. ........................... 106/281 N; 106/273 N; 106/282; 106/287.14; 208/44; 428/391; 428/392; 428/447; 428/489
[58] Field of Search ........... 106/273 R, 273 N, 281 R, 106/281 N, 282, 287.14; 208/44; 428/378, 391, 392, 447, 489

[56] References Cited

U.S. PATENT DOCUMENTS 3,259,512  7/1966  Dickson et al. ................ 106/273 N
3,928,061 12/1975  Hellsten et al. ................ 106/273 N
4,038,102  7/1977  Hellsten et al. ................ 106/273 N Primary Examiner—John Kight, III
Assistant Examiner—Amelia B. Yarbrough
Attorney, Agent, or Firm—Ronald C. Hudgens; Robert F. Rywalski; Keith V. Rockey

[57] ABSTRACT

A bitumen composition modified with an organo silane in which a bitumen such as asphalt is reacted with an organo silane containing ethylenic unsaturation or an organo silane containing at least one hydrogen atom bonded to the silicon atom whereby the organo silanes react with ethylenic unsaturation of the bitumen to chemically bond the organo silane to the bitumen. Also included are bitumens which have been chemically modified by reaction with steam, air, ammonia or aliphatic amines which have been reacted with a silane containing a functional group reactive with the bitumen. Bitumen compositions of the invention are preferably used in the treatment of glass fibers for use as reinforcement in asphalt systems.

3 Claims, No Drawings

ASPHALT COMPOSITIONS MODIFIED WITH ORGANO SILANE COMPOUNDS

This is a continuation of application Ser. No. 133,170, filed Mar. 24, 1980, now U.S. Pat. No. 4,292,371, which was a division of Ser. No. 066,207, filed Aug. 13, 1979, now U.S. Pat. No. 4,243,426, which was a continuation-in-part of Ser. No. 852,772, filed Nov. 18, 1977, now abandoned.

This invention relates to chemically modified bitumen compositions, and particularly to asphalt compositions which have been chemically modified with organo silicon compounds.

As is well known to those skilled in the art, asphalt is a cementitious material predominantly in bitumens which occur in nature as such or are obtained as residue in the refining of petroleum. It has been determined that asphalt chemically is made up of condensed hydrocarbon rings, but it has been further determined that the condensed organic rings contain various reactive groups, notably carbon-to-carbon double bonds. In terms of distribution, asphalt is much like a plastisol in that it is formed of graphitic particles suspended in a viscous liquid; the particles are of the same chemical type but differ from each other in terms of molecular weight. Thus, the liquid phase of asphalt is formed predominantly of lower molecular weight condensed organic rings whereas the graphitic particles suspended therein are made up primarily of high molecular weight condensed organic rings.

It is also known that asphalt can be oxidized by heating it and then passing air or a like oxygen-containing gas through it. That asphalt, commonly known as blown asphalt, differs from untreated asphalt in that the softening point is increased. It has been postulated that the oxidation of the asphalt brings about further condensation of aromatic and cyclic hydrocarbon rings to form a greater proportion of higher molecular weight components. In any case, the oxidation of the asphalt does introduce, it has been found, carboxy groups and hydroxy groups.

Asphalt has been used for many years in road-paving applications as well as numerous other applications calling for strong, inert physical and chemical properties such as roofing and the like. An extensive field for the use of asphalt is now in road-paving applications where the asphalt is modified with fillers, notably glass fibers to provide an increase in the strength and wear resistance of road pavements. One of the difficulties, however, in combining glass, either in the form of glass fibers or as fragments of glass, stems from the fact that glass is a highly hydrophilic material, whereas asphalt, being derived from petroleum, is a highly hydrophobic material. Thus, it has been difficult to establish any bond, either physical or chemical between asphalt and glass surfaces.

It has now been found that the compatibility between glass, either in the form of glass particles or glass fibers and bitumens such as asphalt can be significantly enhanced where the bitumen composition is chemically treated with an organo silicon compound such that the organo silicon compound is chemically bonded directly to the cyclic rings of the asphalt. Without limiting the present invention as to theory, it is believed that the organic group of the organo silicon compound (bonded directly to the silicon atom through a non-hydrolyzable bond) becomes chemically bonded to the bitumen, leaving the hydrolyzable groups attached directly to the silicon atom free to become chemically bonded to the glass surfaces when the chemically-modified bitumen is combined with glass fibers in various applications.

It is accordingly an object of this invention to produce a chemically-modified bitumen composition wherein organo silicon compounds are chemically bonded to the bitumen.

It is a more specific object of this invention to provide a modified bitumen wherein organo silicon compounds are chemically reacted with the bitumen to leave readily hydrolyzable groups attached directly to the silicon atom available to establish a bonding relationship between the modified bitumen and glass with which the bitumen is combined.

The concepts of this invention reside in an asphalt composition wherein a bitumen or chemically-modified bitumen is reacted with an organo silicon compound containing at least one organic group bonded directly to the silicon atom through a non-hydrolyzable bond and at least one readily hydrolyzable group also bonded directly to the silicon atom. The organic group thus reacts with a functional group of the bitumen or modified bitumen to establish a chemical bond between the bitumen and the organo silicon compound, thereby leaving at least one readily hydrolyzable group free to undergo reaction with glass surfaces or to undergo a cross linking reaction to further cross link the bitumen composition.

In accordance with one embodiment of the invention, a bitumen such as asphalt is reacted with an organo silane containing ethylenic unsaturation in the presence of a free radical catalyst. In this embodiment of the invention, the ethylenic unsaturation of the organo silicon compounds reacts with ethylenic unsaturation contained in the bitumen to thereby chemically bond the organo silicon compound to the bitumen.

Organo silicon compounds useful in the practice of this embodiment include organo silanes of the formula:

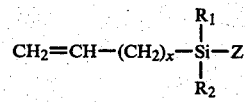

wherein x is 0 or an integer from 1 to 3; Z is a readily hydrolyzable group, and preferably halogen (i.e., chlorine, or bromine) or a $C_1$ to $C_4$ alkoxy group (e.g., methoxy, ethoxy, propoxy, etc.); $R_1$ and $R_2$ are each organic groups or a readily hydrolyzable group as defined above. Where $R_1$ and/or $R_2$ is each an organic group, it can be any of a number of such groups. For example, $R_1$ and/or $R_2$ can be $C_1$ to $C_5$ alkyl, a $C_2$ to $C_5$ alkenyl group, a $C_4$ to $C_7$ cycloalkyl group or a $C_1$ to $C_5$ alkyl group which has been substituted with a functional group selected from the group consisting of a chloro group, a hydroxy group, a mercapto group, an epoxy group, an epoxy-ether group, a carboxyalkoxy group, an amino group or the like. Illustrative of suitable unsaturated silanes include
vinyltrimethoxysilane
gamma-propenyltriethoxysilane
vinyltrichlorosilane
vinylethyldichlorosilane
vinylpropyldimethoxysilane
vinyl-gamma-mercaptopropyldimethoxysilane gamma-propenyl-gamma-aminopropyldiethoxysilane, etc.

The reaction between the unsaturated silane as described above and the bitumen can be carried out in a variety of ways. The most simple and efficient manner of carrying out the reaction involves dissolving the asphalt in a suitable solvent, preferably an inert aromatic solvent, such as benzene, toluene, zylene, etc. at temperatures ranging from 70° to 200° C. Any of a variety of free radical catalysts can be used if desired, preferably peroxide free radical catalysts such as benzoyl peroxide or like catalysts well known to those skilled in the art. The relative proportions between the asphalt and the organo silicon compound can be varied within relatively wide ranges. In general, best results are achieved when the organo silane is used in an amount corresponding from 0.001 to 0.9 parts by weight of the organo silane per part by weight of the asphalt.

As will be appreciated by those skilled in the art, various other silanes containing ethylenic unsaturation, and preferably terminal or omega unsaturation, can be used in place of the silanes described above. There are a number of such silanes known to those skilled in the art, and include those having the general formula:

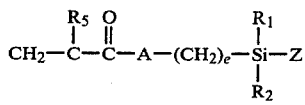

wherein e is an integer ranging from 2 to 6, $R_1$, $R_2$ and Z are as defined above, $R_5$ is hydrogen or methyl and A is O or —NH—. Some of such silanes are commercially available, and include gamma-methacryloxypropyl-trimethoxysilane, sold commercially by Dow-Corning under the product No. Z-6031. It can be prepared by a reaction of the sodium salt of methacrylic acid with the corresponding gamma-chloropropylsilane. Compounds in which A is an —NH— group are also known, having been described in U.S. Pat. No. 3,249,461. Additional organic groups bonded directly to the silicon atom can be introduced into the molecule by reacting the alkali metal salt of the acrylic or methacrylic acid with a haloalkyl silane containing a further organic group bonded directly to the silicon atom in accordance with conventional procedures.

Representative silanes of this type include:
gamma-methacryloxypropyltriethoxysilane,
gamma-acryloxypropyltrimethoxysilane,
 delta-methacryloxybutylethyldimethoxysilane,
gamma-methacryloxypropylvinyldiethoxysilane,
delta-methacryloxybutyl-gamma-aminopropyldimethoxysilane, etc.

Another group of suitable silanes includes those containing a styryl group having the formula:

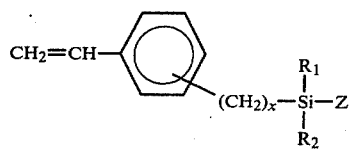

wherein x, $R_1$, $R_2$ and Z have the meaning described above or styryl silanes having the formula:

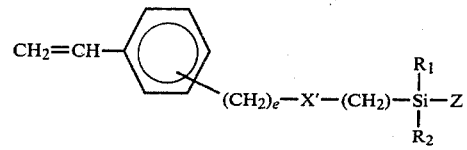

wherein X' is —NH— or —NH—$(CH_2)_e$—NH— and f is an integer from 2 to 6. The former group of styryl silanes are known and are commercially available. The latter type styryl silanes are described by Plueddemann in a paper presented at the Twenty-Seventh Annual Technical Conference at the Reinforced Plastics/Composites Institute.

Illustrative styryl silanes include the following compounds:
beta-styrylethyltrimethoxysilane,
gamma-styrylpropyltrichlorosilane,
beta-styrylethylvinyldimethoxysilane,
delta-styrylbutylpropyldimethoxysilane,
para-styryltrimethoxysilane,
N(beta-styrylethyl)-aminopropyltriethoxysilane.

It is often possible, and indeed sometimes desirable, to employ hydrolysis products of the foregoing silanes instead of the silanes themselves. Such hydrolysis products include the corresponding silanols and polysiloxanes. As is well known to those skilled in the art, such hydrolysis products are formed by contacting the silane with aqueous medium prior to contact with the bitumen.

It is also possible, and sometimes preferable, to react the organo silanes and their corresponding hydrolysis products as described above with chemically-modified bitumens. As used herein, chemically-modified bitumens refer to and include bitumens, and preferably asphalts, which have been modified by reaction with an oxygen-containing gas (e.g., air), ammonia, steam or amines i.e., amines having the formula:

wherein $R_3$ is selected from the group consisting of $C_1$ to $C_{10}$ alkyl and $R_4$ is selected from the group consisting of hydrogen and $C_1$ to $C_{10}$ alkyl groups. Also suitable are the polyalkylene amines having the formula:

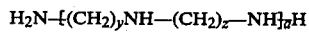

wherein y is an integer from 2 to 6, z is an integer from 2 to 6 and a is 0 or an integer from 1 to 6. In the chemical modification of bitumens with ammonia steam or amines as described above, it is generally desirable to react the chemical modifying agent with the bitumen dissolved in an aromatic solvent while bubbling the ammonia or steam through the bitumen.

In another embodiment of the invention, an organo silicon compound can be bonded to the bitumen by reaction of a silanic hydrogen atom across an ethylenic double bond. In this embodiment of the invention, use is made of an organo silane having the general formula:

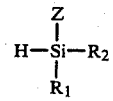

wherein Z, $R_1$ and $R_2$ have the meaning described above. The mechanism of this reaction is somewhat different from that of the free radical reaction described above in that the silicon atom becomes bonded directly to one carbon atom of the ethylenic double bond of the bitumen. This reaction may be illustrated by way of the following reaction:

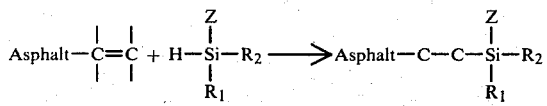

The silicon atom still contains, it will be noted, at least one hydrolyzable group capable of bonding with glass surfaces. In addition, the $R_1$ and $R_2$ groups attached to the silicon atom are available to further interact with the bitumen to cross link the same.

The reaction between the bitumen, and preferably asphalt, and a silane containing a silanic hydrogen atom can be carried out according to well-known techniques, using a catalyst of the type used in the prior art for this reaction. Preferred is chloroplatinic acid. In carrying out the reaction, the asphalt can be dissolved in a suitable aromatic solvent of the type described above and the silane and catalyst added thereto in accordance with conventional procedures.

The reaction between a hydrogen-containing silane and bitumen described above is preferably carried out using unmodified bitumen. However, it is also possible, and, in some instances, desirable, to carry out the reaction using a chemically-modified bitumen of the type described above with either a hydrogen-containing silane or the corresponding hydrolysis product thereof.

Illustrative of silanes useful in accordance with this concept of the invention include:
methyldichlorosilane,
ethyldimethoxysilane,
gamma-aminopropyldimethoxysilane,
delta-mercaptobutyldiethoxysilane, and
bis-butylmethoxysilane.

In accordance with a further embodiment of the invention, organo silanes or their hydrolysis products can be chemically bonded to chemically-modified bitumens by reacting an organo silane containing a functional group reactive with a functional group of the bitumen. As has been described above, air or steam-modified bitumen has been found to contain carboxy groups and hydroxy groups. Thus, a silane or its corresponding hydrolysis product wherein the silane contains a functional group capable of reaction with the functional group of the silane can be used to form a chemical bond directly between the functional group of the bitumen and the functional group of the silane or its corresponding hydrolysis product. Illustrative of this concept of the invention are silanes containing an amino group, a hydroxy group, a halogen group or an epoxy group. Such silanes can be represented by the general formula:

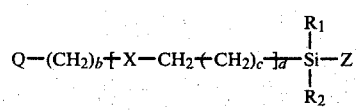

wherein Q is a functional group selected from the group consisting of an amino group, a hydroxy group, a halogen atom and a mercapto group; b is an integer ranging from 2 to 6; X is 0 or NH; c is an integer from 1 to 6; d is 0 or an integer from 1 to 5; and $R_1$, $R_2$ and Z are defined above. Illustrative of suitable silanes of this type include:
gamma-aminopropyltriethoxysilane,
gamma-aminopropylmethyldiethoxysilane,
bis-gamma-aminopropyldiethoxysilane,
gamma-hydroxypropyltriethoxysilane,
delta-chlorobutyldimethoxysilane,
gamma glycidoxypropyltrimethoxysilane,
gamma-mercaptopropyltrimethoxysilane
as well as numerous others known to those skilled in the art. Also included are polyaminosilanes such as Z-0020 marketed by Dow Corning. That silane has the structural formula: $H_2N\text{-}CH_2\text{-}CH_2\text{-}NH\text{-}CH_2\text{-}CH_2\text{-}CH_3\text{-}Si(OCH_3)_3$ Considering, for example, gamma-aminopropyltriethoxysilane, it is believed, without limiting this invention as to theory, that the carboxy group present in oxidized or blown asphalt undergo reaction with the amino group of the silane to form an amide in accordance with the following:

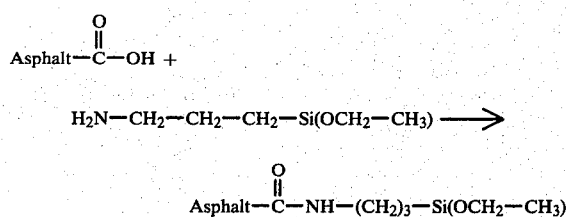

It will thus be observed that the organic group is bonded directly to the bitumen through an amide linkage, leaving available the hydrolyzable hydroxy groups for reaction with glass surfaces to promote adhesion between modified bitumen and the glass surfaces. Similar reactions occur with other functional organo silane, such as the formation of an ester linkage when using a hydroxy silane or an epoxy silane, a thiol ester linkage when using a mercapto silane, etc.

It is frequently desirable, when carrying out reactions of this type, to use either an acid or a basic catalyst to promote the reaction between the carboxy group and the functional group of the silane, although heat is frequently sufficient to cause the reaction to proceed. Conventional catalysts commonly used in organic reactions can be used for this purpose.

It has been found that the use of other chemically-modified bitumens does serve to increase the variety of silanes which can be used. For example, bitumen which has been contacted with ammonia to aid an amino group to the asphalt does enable use to be made of silanes containing a carboxy group. One such hydroxy group is N-[3-(triethoxysilyl)propyl]maleamic acid. That silane has the formula:

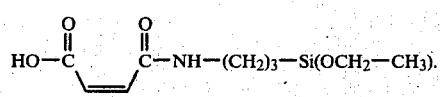

Thus, use can be made of carboxy silanes having the general formula:

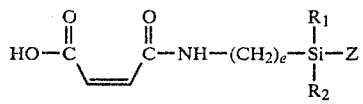

$$\text{HO}-\overset{\overset{O}{\|}}{C}\diagdown\diagup\overset{\overset{O}{\|}}{C}-\text{NH}-(\text{CH}_2)_e-\overset{\overset{R_1}{|}}{\underset{\underset{R_2}{|}}{\text{Si}}}-Z$$

wherein $R_1$, $R_2$ and Z have the meaning described above and e is an integer ranging from 2 to 8.

As will be appreciated by those skilled in the art, the same carboxy-containing silanes as described above can also be used with blown bitumen and with bitumen which has been modified by contact with steam, both operations serving to introduce hydroxy groups to the cyclic groups of the bitumen.

The reaction between a chemically-modified bitumen and the functional silanes as described above is preferably carried out by dispersing the bitumen in an aromatic solvent inert under the reaction conditions (i.e., benzene, toluene, xylene, etc.) and then adding the silane either with or without a catalyst to promote the reaction. Catalysts useful are conventional acid and basic catalysts known to promote like esterification reactions and the formation of amides. Best results are usually achieved when the reaction is carried out at a temperature ranging from 70° to 200° C.; proportions between the silane and the bitumen are the same as those described above. In addition to the use of silanes as such, it is also possible to use the corresponding hydrolysis products thereof (i.e., the corresponding silanols and polysiloxanes).

The bitumen compositions of this invention, chemically modified with organo silicon compounds, can be used in a variety of applications. For example, bitumen compositions of the invention are highly suitable for use in road paving applications, and particularly in road paving applications wherein the asphalt is reinforced with glass, either in the form of glass fibers or in the form of glass frit. In addition, the bitumen compositions of this invention can also be used in the treatment of glass fibers to improve the bonding relationship between the glass fibers and a wide variety of materials frequently reinforced with glass. For example, the bitumen compositions of this invention can be applied as a thin coating to individual glass fiber filaments or as an impregnant to bundles of glass fibers whereby the bitumen coating or impregnant serves to intertie the glass fiber surfaces with, for example, treated or untreated bitumen used in road paving applications.

The bitumen compositions of the invention can also be used in the treatment of glass fibers as described above to promote compatibility between the treated glass fibers and other glass fiber reinforced material, including, but not limited to, rubber as in the manufacture of glass fiber reinforced tires and the like and plastics, as in the manufacture of glass fiber reinforced plastics.

When used as a coating or impregnating composition in the treatment of glass fibers, the organo silicon compound grafted to the bitumen serves to intertie the asphalt to the glass fiber surfaces. The bitumen coating or impregnant, in turn, serves to intertie the treated glass fibers with bitumen, rubber, plastics and the like, the latter constituting a continuous phase in which the bitumen-treated glass fibers are distributed as reinforcement.

When used in the coating or impregnation of glass fibers and bundles of glass fibers, respectively, use can be made of the bitumen compositions of this invention in amounts covering wide ranges. Generally, the coating or impregnant is applied in an amount sufficient to constitute from 0.1 to 50% by weight, or even higher, of the weight of the glass fibers. As will be appreciated by those skilled in the art, the proportions of the silicon-modified bitumen compositions of this invention applied to the glass fibers is not critical, and depends primarily on the applications to which the coated or impregnated fibers are put.

Having described the basic concepts of the present invention, reference is now made to the following examples, which are provided by way of illustration and not by way of limitation, of the practice of this invention in the preparation of bituminous asphalt compositions chemically modified with organo silicon compounds and their use in the reinforcement of asphalt, rubber and plastic materials.

EXAMPLE 1

A solution of 200 parts by weight of a paving grade asphalt (50/60 penetration at 77° F.) was dissolved in 50 parts by weight of toluene and placed in a stirred flask equipped with a heater. Thereafter, 1.5 parts by weight of vinyltrimethoxysilane and one part by weight of benzoyl peroxide are added to the solution.

The solution is then heated to reflux 4 hours. At the end of that time, the heating is discontinued, and the toluene solvent removed. The resulting bitumen was found to have a silicon content of about 0.1% by weight.

EXAMPLE 2

Using the procedure described in Example 1, 1.9 parts by weight of vinylethyldichlorosilane is reacted with a bitumen in the presence of benzoyl peroxide as a catalyst.

The product is found to contain 0.09% by weight silicon after removal of the solvent.

EXAMPLE 3

Using the procedure described in Example 1, 2 parts by weight of vinyl-gamma-aminopropyldiethoxysilane is reacted with asphalt to form a silicon-modified bituminous composition containing 0.05% by weight silicon.

EXAMPLE 4

Using the same procedure described in Example 3, 3 parts by weight of beta-styrylethyltrimethoxysilane is reacted with 200 parts of asphalt in the presence of benzoyl peroxide as a catalyst. The reaction is continued for 3 hours, and a silicon-modified asphalt composition is recovered.

EXAMPLE 5

Using the same procedure described in Example 4, 3 parts by weight of N(beta-styrylethyl)aminopropyltrimethoxysilane is reacted with 200 parts by weight of asphalt in the presence of benzyl peroxide as a catalyst. After about 6 hours, a silicon-modified asphalt composition is recovered from the reaction mixture.

EXAMPLE 6

Using the procedure described in Example 1, 3.1 parts by weight of gamma-methacryloxypropyltrimethoxysilane is reacted with 200 parts by weight asphalt in the presence of benzoyl peroxide as a catalyst. The reaction is allowed to continue for 3 hours, and then the solvent is distilled off, leaving a silicon-modified asphalt composition.

EXAMPLE 7

Using the procedure and proportions described in the preceding example, gamma-methacrylamidopropyltrimethoxysilane is reacted with asphalt. The product is again a silicon-containing asphalt composition.

EXAMPLE 8

In this example, the materials and procedure described in Example 1 are repeated, except that prior to reaction of the asphalt with the organo silicon compound, the asphalt is treated by bubbling air therethrough while the asphalt solution is maintained at reflux temperature. Air was bubbled through the asphalt solution for one hour, and analysis showed that the asphalt had oxygen content of 1.33% by weight.

After reaction with the organo silicon compound employed in Example 1, it was found that the silicon-modified asphalt composition had a somewhat greater viscosity than that produced in Example 1; it was found to contain approximately 0.05% by weight silicon.

EXAMPLE 9

In this example, a sample of asphalt as described in Example 1 is dissolved in toluene, heated to reflux and then ethyl amine is added to the solution in an amount corresponding to 1.5 parts by weight of amine per 100 parts by weight of asphalt. After about two hours, the heating is discontinued, and the asphalt determined by analysis to contain approximately 0.96% by weight nitrogen.

The aminated asphalt is then reacted with vinylethyldichlorosilane in accordance with the procedure described in Example 2. A silicon-modified asphalt composition is recovered from the reaction vessel.

EXAMPLE 10

A sample of 100 parts by weight of the asphalt described in Example 1 is dissolved in 30 parts by weight of toluene and one part by weight of chloroplatinic acid is added to the solution. Thereafter, propyldimethoxysilane is added slowly over the course of three hours while the solution is maintained at reflux. The total amount of silane added is 3 parts by weight of silane per 100 parts by weight of asphalt.

At the end of the time, a silicon-modified asphalt containing 0.04% by weight silicon is recovered from the reaction mixture.

EXAMPLE 11

Using the procedure described in Example 9, an aminated asphalt is prepared by reacting asphalt with ethylenediamine for two hours to form an aminated asphalt having a nitrogen content of 0.61% by weight.

Thereafter, using the procedure described in Example 10 the aminated asphalt is reacted with gamma-aminopropyldimethoxysilane to form a silicon-modified asphalt having a silicon content of 0.31% by weight.

EXAMPLE 12

In this example, a blown asphalt as described in Example 8 is reacted with gamma-aminopropyltrimethoxysilane in a weight ratio of 2.5 parts by weight of the amino silanes per 100 parts by weight of the asphalt. A silicon-modified asphalt containing 0.01% by weight silicon is recovered from the reaction vessel.

EXAMPLE 13

This example illustrates the use of the asphalt compositions produced in Examples 1 to 12.

Each of the modified asphalts described in Examples 1 to 12 is formulated into a hot melt through which a bundle of glass fibers is immersed according to the procedure described in U.S. Pat. No. 3,869,306. The asphalt composition is applied such that the asphalt serves to coat the glass fibers forming the bundle and separate the glass fibers each from the other so that the asphalt completely penetrates the interstices between the individual glass fibers forming the bundle. Usually an amount of asphalt ranging from 1 to 50% based upon the weight of the glass fibers is sufficient to achieve that coating.

As will be appreciated by those skilled in the art, the glass fiber bundles can be in the form of a plurality of glass fiber filaments, including yarns, cords, woven or nonwoven fabrics and the like. The resulting asphalt-coated glass fibers can then be used as reinforcement for asphalt alone or asphalt blended with aggregate in the laying of roads and the like. The asphalt-coated glass fibers thus serve as reinforcement for the blend of asphalt and aggregate, the latter forming a continuous phase in which the asphalt or asphalt and aggregate are distributed. It is believed that the silicon compounds introduced to the modified asphalt serve to intertie the glass fibers to the asphalt coating on the glass surfaces, and that the latter promotes compatibility between the asphalt and the glass fiber surfaces.

It will be understood that various changes and modifications can be made in the details of procedure, formulation and use without departing from the spirit of the invention, especially as defined in the following claims.

We claim:

1. Glass fibers coated with a silicon-modified bitumen composition prepared by reaction of (1) a bitumen chemically modified with a modifying agent selected from the group consisting of, ammonia and an amine, said amine having the formula $R_3$-NH-$R_4$ or $H_2N$-$(CH_2)_y$ NH$[(CH_2)_z$-NH$]_a$H wherein $R_3$ is a $C_1$-$C_{10}$ alkyl, $R_4$ is hydrogen or a $C_1$-$C_{10}$ alkyl, y is an integer from 2 to 6, z is an integer from 2 to 6 and a is 0 or an integer from 1 to 6 and (2) an organo silicon compound selected from the group consisting of a compound having the formula:

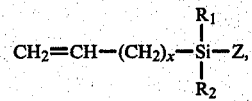

a compound having the formula:

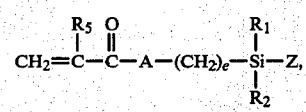

a compound having the formula:

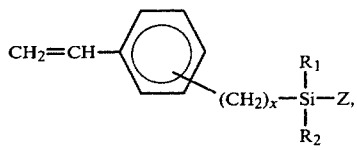

and a compound having the formula:

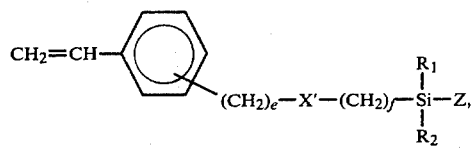

wherein x is 0 or an integer from 1–3, Z is a readily hydrolyzable group; $R_1$ and $R_2$ are selected from the group consisting of Z and a non-hydrolyzable organic group; $R_5$ is hydrogen or methyl; A is 0 or —NH—; e is an integer from 2–6, X' is —NH— or —NH—$(CH_2)_e$—NH— and f is an integer from 2 to 6 and the hydrolysis products of said organo silicon compound, in the presence of a catalyst to promote the reaction between the ethylenic unsaturation of said organo silicon compound with ethylenic unsaturation in the bitumen.

2. Glass fibers coated with a silicon-modified bitumen composition prepared by reaction of (1) a bitumen chemically modified with a modifying agent selected from the group consisting of ammonia and aliphatic amines, and (2) an organo silicon compound selected from the group consisting of an organo silane containing at least one hydrogen atom bonded to the silicon atom which is capable of reaction with ethylenically unsaturated double bonds of the bitumen in the presence of a catalyst effective to promote the reaction of the silicon compound with the ethylenic unsaturation of the bitumen.

3. A glass fiber reinforced asphalt system comprising a bitumen and glass fibers as defined by claim 1 or claim 2.

* * * * *